United States Patent
Birdal et al.

(10) Patent No.: US 9,483,237 B2
(45) Date of Patent: Nov. 1, 2016

(54) METHOD AND SYSTEM FOR PROVIDING AN IMAGE EFFECTS INTERFACE

(75) Inventors: Tolga Birdal, Izmir (TR); Emrah Bala, Malatya (TR); Emre Koc, Istanbul (TR); Mehmet Ozkanoglu, Istanbul (TR); Abdi Tekin Tatar, Istanbul (TR)

(73) Assignee: BEFUN BILGI TEKNOLOJILERI A.S., Istanbul (TR)

( * ) Notice: Subject to any disclaimer, the term of this patent is extended or adjusted under 35 U.S.C. 154(b) by 2165 days.

(21) Appl. No.: 12/396,369

(22) Filed: Mar. 2, 2009

(65) Prior Publication Data

US 2010/0223565 A1    Sep. 2, 2010

Related U.S. Application Data

(63) Continuation-in-part of application No. 12/371,243, filed on Feb. 13, 2009, now Pat. No. 8,629,883.

(60) Provisional application No. 61/032,398, filed on Feb. 28, 2008.

(51) Int. Cl.
| | |
|---|---|
| *G06F 9/44* | (2006.01) |
| *G06K 9/40* | (2006.01) |
| *G06T 1/00* | (2006.01) |
| *G06T 5/00* | (2006.01) |
| *G06F 9/455* | (2006.01) |

(52) U.S. Cl.
CPC ............ *G06F 8/34* (2013.01); *G06F 9/45512* (2013.01); *G06T 1/00* (2013.01); *G06T 5/00* (2013.01); *G06T 5/001* (2013.01)

(58) Field of Classification Search
USPC ........................................................ 717/120
See application file for complete search history.

(56) References Cited

U.S. PATENT DOCUMENTS

| | | | |
|---|---|---|---|
| 5,966,454 A * | 10/1999 | Thomas et al. ............. | 382/111 |
| 6,184,926 B1 | 2/2001 | Khosravi et al. | |
| 6,226,015 B1 | 5/2001 | Danneels et al. | |
| 6,545,682 B1 | 4/2003 | Ventrella et al. | |
| 6,763,515 B1 * | 7/2004 | Vazquez et al. ............. | 717/109 |
| 6,804,418 B1 | 10/2004 | Yu et al. | |
| 8,629,883 B2 | 1/2014 | Birdal et al. | |
| 2003/0028543 A1 | 2/2003 | Dusberger | |
| 2004/0136570 A1 | 7/2004 | Ullman et al. | |
| 2005/0135701 A1 | 6/2005 | Atkins | |
| 2006/0072844 A1 | 4/2006 | Wang et al. | |
| 2006/0082579 A1 | 4/2006 | Yao | |

(Continued)

OTHER PUBLICATIONS

Notice of Allowance mailed Jul. 9, 2013, in U.S. Appl. No. 12/371,243 by Birdal, T., et al., filed Feb. 13, 2009.

(Continued)

*Primary Examiner* — Lewis A Bullock, Jr.
*Assistant Examiner* — Mark Gooray
(74) *Attorney, Agent, or Firm* — Perkins Coie LLP

(57) ABSTRACT

A method and system for generating user-accessible effects. The method includes receiving a library of operators, each operator including a set of operations performable on an image. The method includes receiving an effect definition from a designer via a graphical user interface, wherein the effect definition includes a set of operators from the library to be executed on a user-provided image and parameters associated with each operator. The method includes saving the effect definition to an accessible memory. The method includes uploading the effect definition to a servers wherein the effect definition is accessible to a user over a network.

20 Claims, 17 Drawing Sheets

(56) References Cited

U.S. PATENT DOCUMENTS

| | | | |
|---|---|---|---|
| 2008/0075381 A1 | 3/2008 | Ishimaru | |
| 2008/0200191 A1 | 8/2008 | Rao et al. | |
| 2008/0225045 A1* | 9/2008 | Birtwistle et al. | 345/420 |
| 2008/0284791 A1 | 11/2008 | Bressan et al. | |
| 2009/0087035 A1 | 4/2009 | Wen et al. | |

OTHER PUBLICATIONS

Notice of Allowance mailed Sep. 12, 2013, in U.S. Appl. No. 12/371,243 by Birdal, T., et al., filed Feb. 13, 2009.
Decarlo, D. et al.; "Stylization and Abstraction of Photographs" Siggraph 2002; vol. 21, No. 3, Jul. 31, 2002; pp. 769-776; XP-002471019.
Wen, F., et al., "Color sketch generation", Proceedings of the 4th international symposium on Non-photorealistic animation and rendering, Jun. 5-7, 2006, Annecy, France, pp. 47-54.
Final Office Action mailed Apr. 12, 2012, in U.S. Appl. No. 12/371,243 by Birdal, T., et al., filed Feb. 13, 2009.
Final Office Action mailed Feb. 13, 2013, in U.S. Appl. No. 12/371,243 by Birdal, T., et al., filed Feb. 13, 2009.
International Search Report PCT/IB2009/005372 dated Oct. 2, 2009; pp. 1-4.
Written Opinion PCT/IB2009/005372 dated Oct. 2, 2009; pp. 1-13.
Non-Final Office Action mailed Aug. 30, 2012, in U.S. Appl. No. 12/371,243 by Birdal, T., et al., filed Feb. 13, 2009.
Non-Final Office Action mailed Sep. 16, 2011, in U.S. Appl. No. 12/371,243 by Birdal, T., et al., filed Feb. 13, 2009.
Priese, L.; et al., "Introducation to the Color Structure Code and its Implemention" Apr. 24, 2003; pp. 1-20.
Rosenfeld, A. et al.; "Digital Picture Processing"; vol. 2 (pp. 240-251); Jan. 1, 1982; Academic Press Inc; San Diego, USA, XP002546166.
Sonka, M. et al.; "Image Processing Analysis and Machine Vision"; pp. 77-79; Jan. 1, 1999; Brooks/Cole Publishing Company; Pacific Grove; USA; XP002546167.
U.S. Appl. No. 12/371,243 by Birdal, T., et al., filed Feb. 13, 2009.
Weickert, J. et al.; "Coherence-Enhancing Diffusion Filtering"; International Journal of Computer Vision; Kluwer Academic Publishers; Norwell; USA; vol. 31; No. 2/03; Apr. 1, 1999; pp. 111-127; XP000832599.
Winnemoller, et al.; "Real-Time Video Abstraction"; ACM Transaction on Graphics (TOG) Jan. 31, 2006; vol. 25; No. 3; pp. 1221-1226; New York, USA; XP040042258.

* cited by examiner

METHOD AND SYSTEM FOR PROVIDING AN IMAGE EFFECTS INTERFACE

CROSS REFERENCE TO RELATED APPLICATIONS

This application is a Continuation-In-Part of co-pending U.S. patent application Ser. No. 12/371,243 entitled "METHOD AND SYSTEM FOR GENERATING ONLINE CARTOON OUTPUTS" filed on Feb. 13, 2009, which claims the benefit of U.S. Provisional Patent Application Ser. No. 61/032,398 entitled "METHOD SYSTEMS AND INTERFACES FOR GENERATING ONLINE CARTOONS IN 2D SCENES filed on Feb. 28, 2008, and which are expressly incorporated by reference herein.

BACKGROUND

Multimedia is media and content that utilizes one or more content forms. For example, multimedia can include text, audio, still images, animation, video, and interactivity content forms. Multimedia can be transmitted over a network, such as an Internet, and be used to communicate. For example, digital photos can be posted as a photo album online for viewing by any member of the public. In another example, a user can utilize a digital photo as an online avatar (or representative icon) in user transactions online.

Digital images can be obtained in a variety of ways, including from a digital camera, a scanner scanning a physical paper, or via various graphical applications for creating digital imagery. Such digital images can be stored in a variety of standard Raster file formats, including JPEG, BMP, TIFF, RAW, PNG, and GIF. Alternatively, digital images can be stored in vector formats, such as CGM and SVG.

Media including digital images can be manipulated via various operators, which create or enhance media characteristics. Example operators for images include transforming, clustering, diffusion, filtering, and thresholding. For example, filtering can removing undesired characteristics within an image, such as a specific color or brightness.

Multiple operators can be combined to form effects that alter a digital image in a predetermined manner. For example, an effect for converting a color image to a black-and-white image for transmission over the Internet can crop the image to a manageable size, remove noise from the image, and convert brightness of image pixels into a grayscale pixel. The effect thus provides a black-and-white image ready for distribution over the Internet.

A graphical user interface (GUI) is a type of user interface which allows people to interact with electronic devices such as computers; hand-held devices such as MP3 Players, Portable Media Players or gaming devices; household appliances and office equipment. A GUI offers graphical icons, and visual indicators, as opposed to text-based interfaces, typed command labels or text navigation to fully represent the information and actions available to a user. The actions are usually performed through direct manipulation of the graphical elements via devices such as pointer devices.

Thus, there is a need to provide an improved user interface allowing designers to easily design effects from pre-existing operators, and to provide the effects to users over a network from a server.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
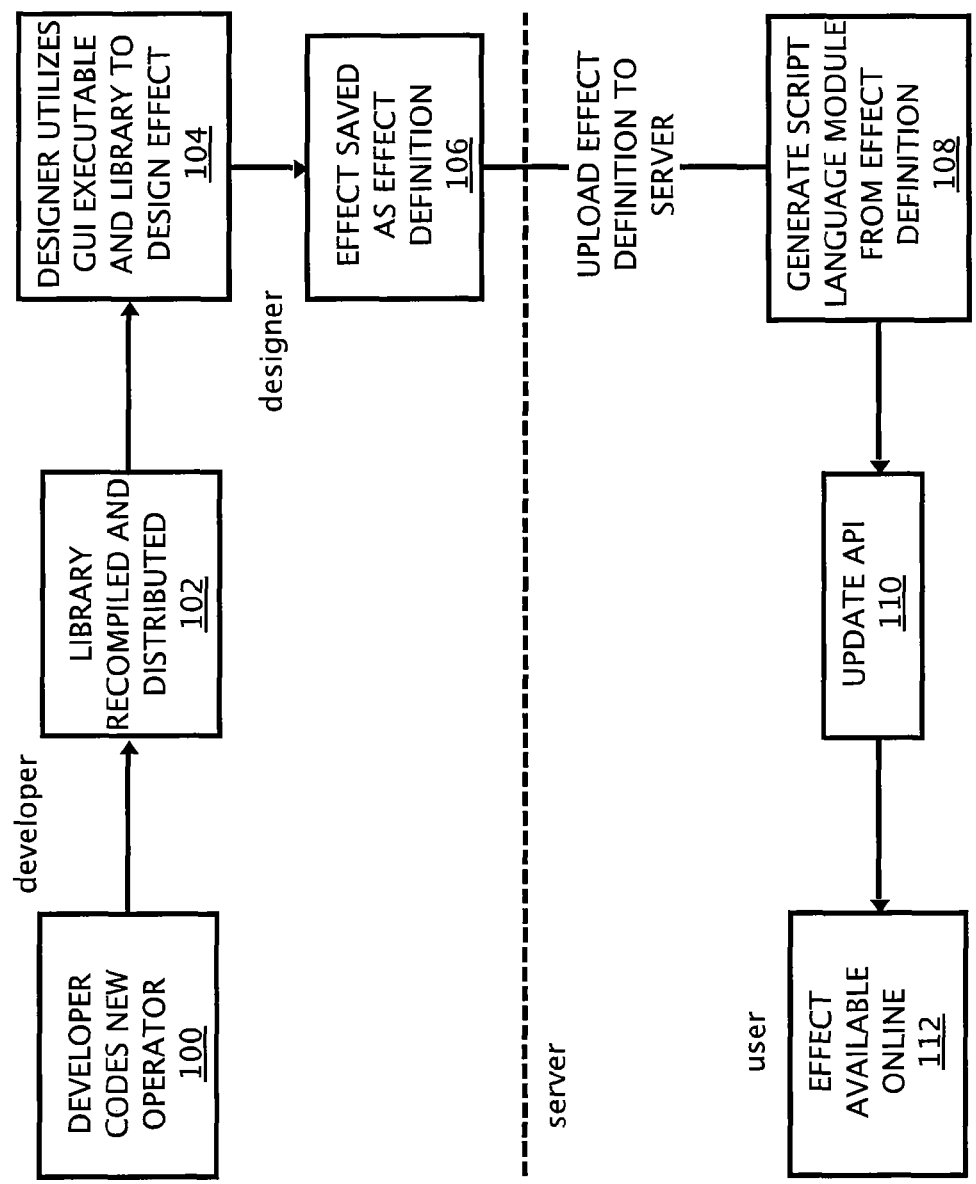
FIG. 1 illustrates an example process for providing user-accessible effects.
Figure 2:
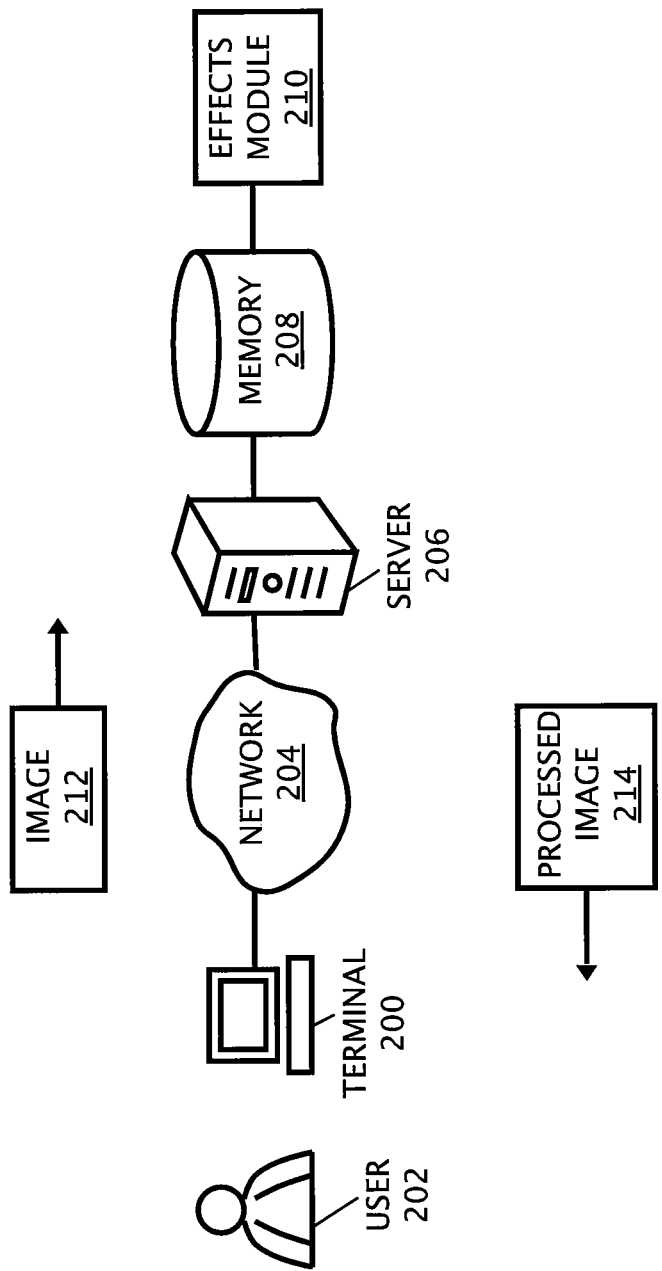
FIG. 2 illustrates an example system for providing user-accessible effects.

A graphical user interface allows designers to create effects from available operators. For example, image operators are coded by developers to manipulate digital images and compiled into an operator library. The operator library is compiled and distributed to the designers along with a GUI executable. The designers utilize the GUI to define a desired effect via manipulations of available operators. For example, an effect can be defined by specifying which operators are used, the order in which the operators are used, and operator parameters. Once the effect is defined, an effect definition is created and uploaded to a server. The server makes the effect available to users over a network. Example effects can include converting a user-provided image into a cartoon FIG. 1 illustrates an example process for providing user-accessible effects. The process can execute on a system as illustrated in FIG. 2. The example process depicts interactions between developers, designers, and users from creation of new operators, defining a new effect, and making the effect available to users over a network. The upper portion of the figure can execute in a distributed manner, for example, at a developer or designer's workstation. The lower portion of the figure can execute on an effects server.

In 100, a developer conceives and codes a new operator. The operator can be coded in a programming language such as C++ and exploit CPU and GPU capabilities.

[Please include brief description of each example operator] Example operators include transforming, clustering, diffusion, filtering, and thresholding. Example transform procedures include fft_image3D, inv_fft_image3D, correlation_fft_image3D.

Example clustering operators include cluster_disjoint_universe_image and cluster_image_kmeans.

Example diffusion operators include anisotropic_diffusion_image and coherence_enhancing_diffusion_image.

Example filtering operators include generalized_kuwahara_image, bump_emboss_image, and simulate_radial_motion_image, wiener_image.

Example thresholding operators include get_local_entropy_threshold_image, get_joint_entropy_threshold_image, get_global_entropy_threshold_image, smooth_threshold_image, solve_system_image_svd, and solve_system_image_lu.

Example geometric operators include fit_bezier, fit_line, and fit_circle, fit_ellipse.

Example fast region operators include connection_region.

Additional operators can be coded by developers as desired.

In 102, a core library is recompiled with the new operator of 100. The library is then distributed along with a GUI executable providing a GUI for combining operators into effects. In one example embodiment, updates are distributed as patches to the library and/or the executable.

In 104, a designer utilizes the core library and included operators to design an effect. The executable can provide a GUI allowing a designer to create an effect by defining which operators to use, in what order to use the operators, and define parameters for the operators. For example, an effect can be designed via a user interface as depicted in FIGS. 4A to 4F.

In 106, the designer saves the effect designed in 104 as an effect definition. For example, the GUI executable can allow the designer to preview the effect as applied to one or more test images. Once the designer is satisfied with the effect, the effect is saved as an effect definition. For example, the effect definition can define the effect in terms of operators and parameters. The effect definition is uploaded to the server.

In 108, the server automatically generates a script language module from the effect definition. For example, the scripting language can support low-level communication between operators and the library and enhance performance. The script language module can be a translation of the uploaded effect definition.

In 110, the server updates relevant application programming interfaces (API). The API can interface between user requests received over a network and the script language module created in 108.

In 112, the effect is made available online. Users are able to select an effect, upload images, and receive a processed image in accordance to the effect. For example, effects can be accessed by users via a user interface as depicted in FIGS. 5A to 5F.

Figure 6:
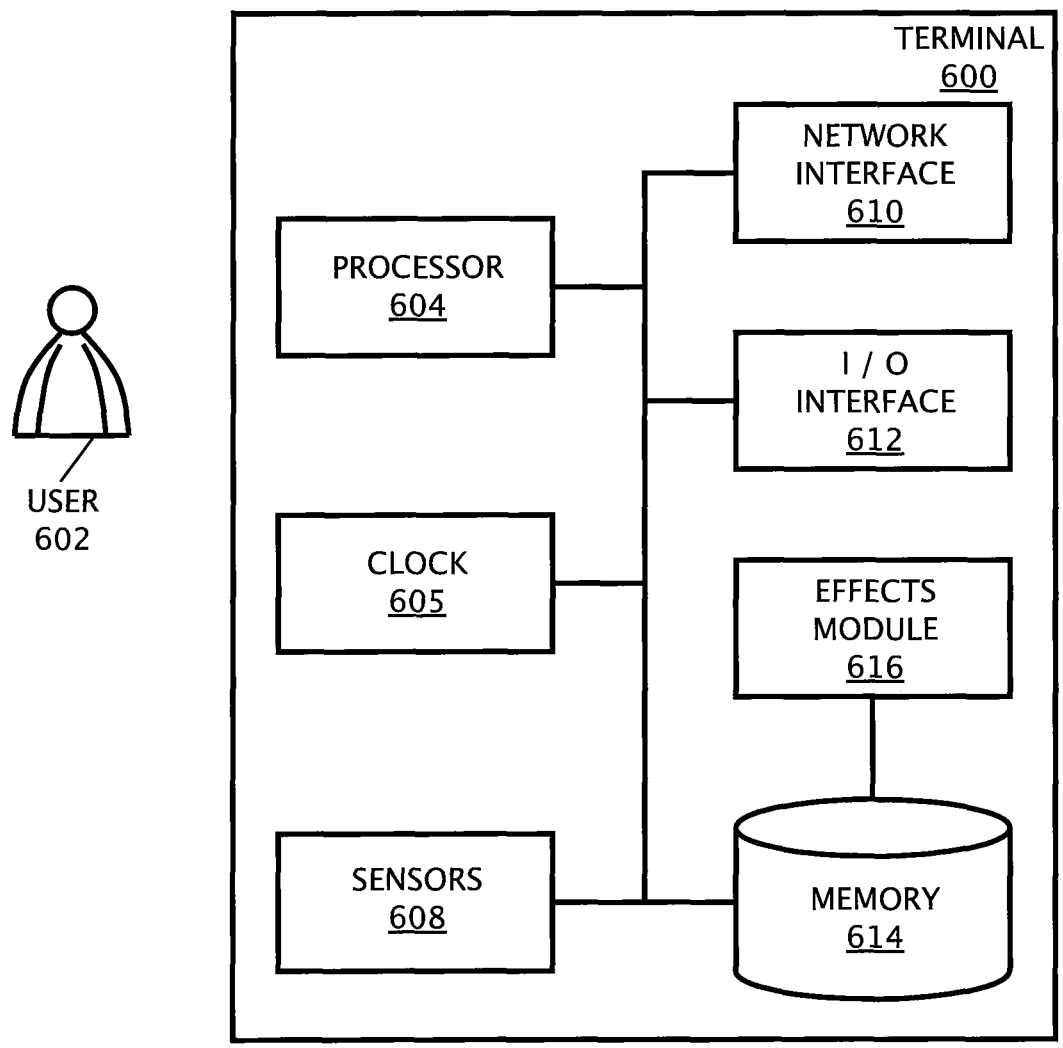
FIG. 6 illustrates an example terminal for providing user-accessible effects.

FIG. 2 illustrates an example system for providing user-accessible effects. A terminal 200, such as a personal computer or other computing device, is accessible to a user 202. The terminal 200 can execute a web browser or another application to interface with other computing devices. The terminal 200 can be as illustrated in FIG. 6.

Figure 7:
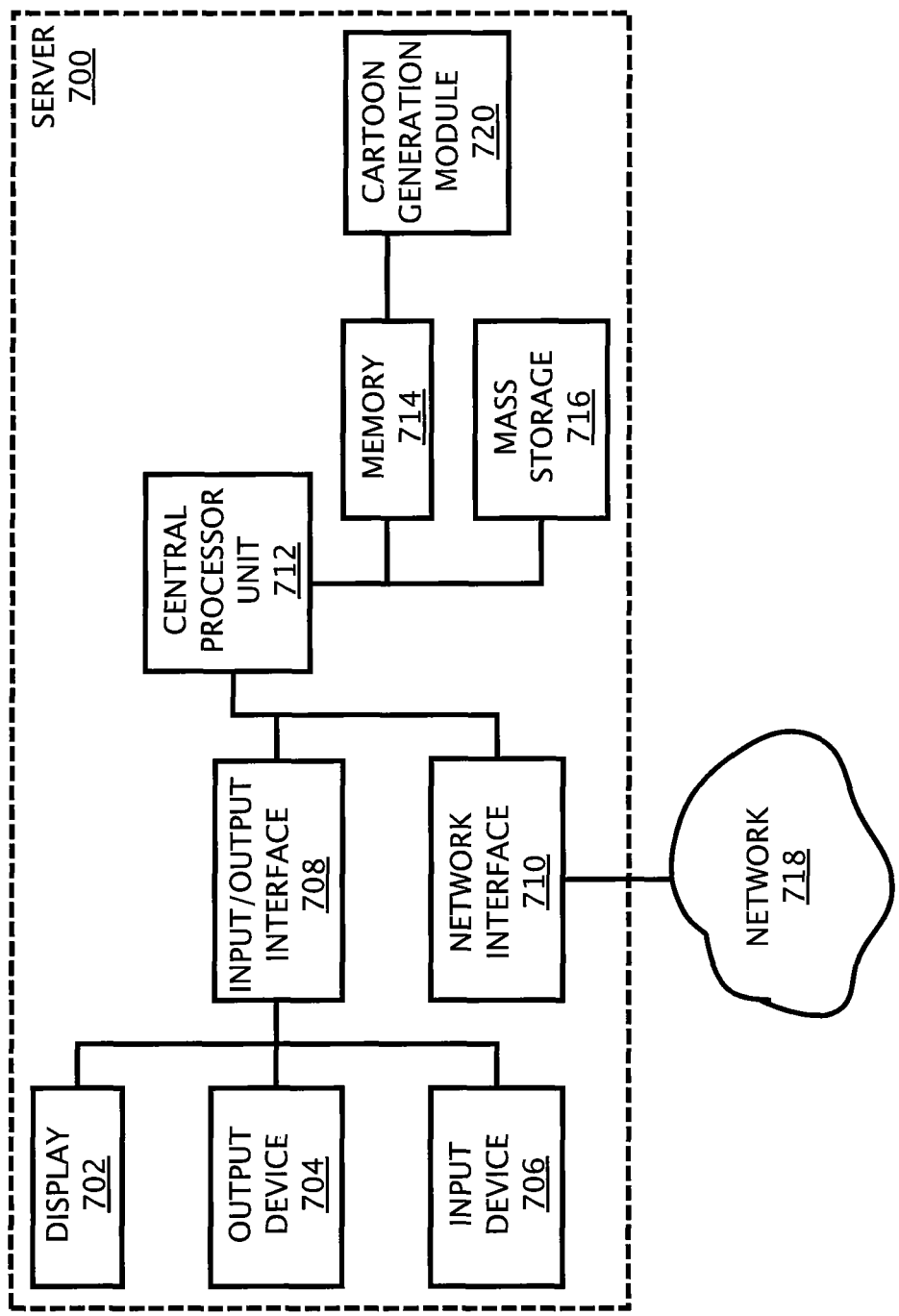
FIG. 7 illustrates an example server for providing user-accessible effects.

The terminal 200 communicates with a server 206 over a network 204. The network can be any network configured to carry digital communications, such as the Internet. The server 206 can be a computing device configured to serve one or more terminals, as illustrated in FIG. 7.

The server 206 is in communications with a memory 208. The memory 208 can store computer-readable instructions for providing an interface to generate a cartoon responsive to predefined algorithms and user-provided parameters. The computer-readable instructions can be part of an effects module 210, discussed below.

It will be appreciated that functionality providing effects can be split between the server 206 and the terminal 200. For example, simple pre-processing of the image, such as cropping or color correction, can occur at the terminal 200. More intensive processing can occur at the server 206.

In FIG. 2, in operation, the user 202 submits an image 212 to the server 206 for processing. The user 202 interacts with the server 206 via an effects user interface. Processing includes adding effects to the image. The server 206 executes the module 210 with parameters received from the user 202, which processes the image 212. A resulting processed image 214 is provided back to the user 202. It will be appreciated that no physical transmission of the image 212 or processed image 214 is necessary. For example, URL addresses can be provided, allowing the terminal 200 and the server 206 to retrieve relevant files from locations accessible over the network 204.

Figure 3:
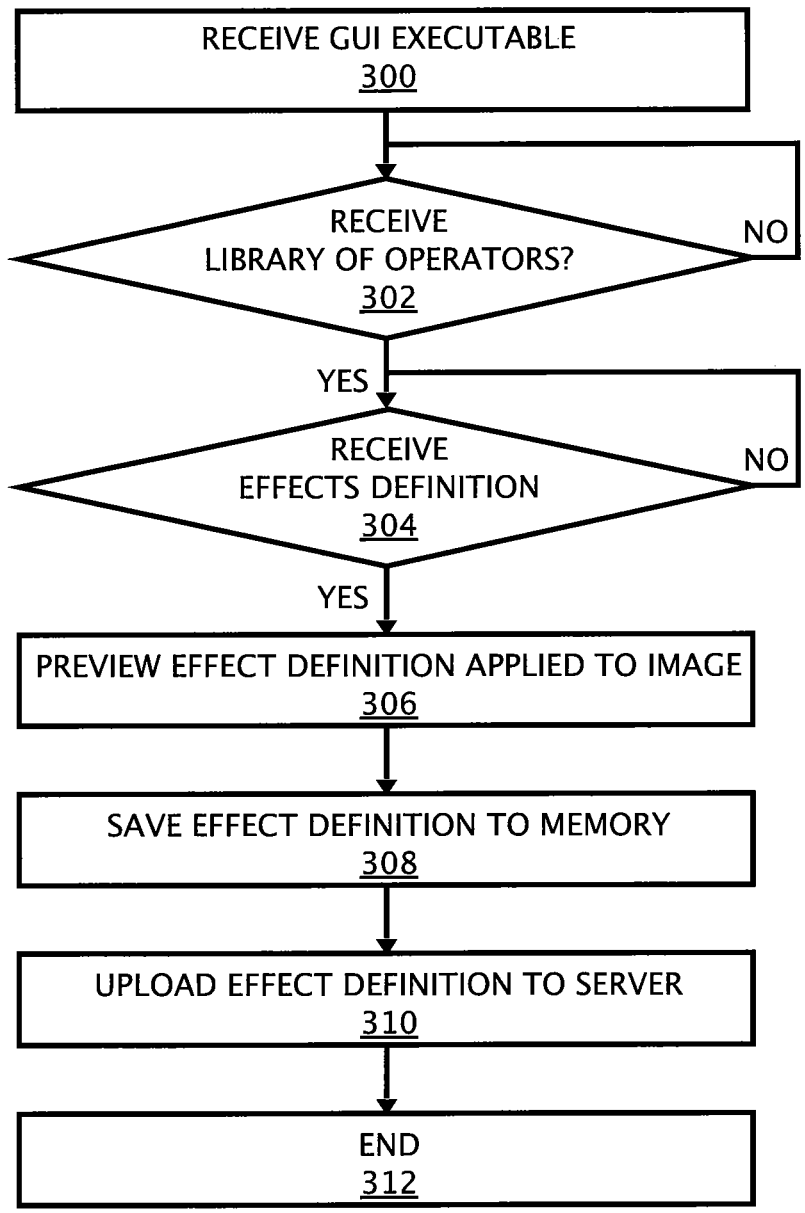
FIG. 3 illustrates an example procedure for providing user-accessible effects.

FIG. 3 illustrates an example procedure for providing user-accessible effects. The procedure can execute on a designer terminal, as illustrated in FIG. 6. The designer terminal can allow a designer to define an effect from existing operators, and then upload the defined effect to a server that provides the effect to users over a network. The operators and effects can be as discussed above.

In 300, the terminal optionally receives a GUI executable. As discussed above, a GUI executable can be distributed by developers along with a library of available operators. The GUI executable can be configured to provide a GUI allowing a designer to design an effect, as illustrated in FIGS. 4A to 4F.

In 302, the terminal tests whether the library of operators has been received. As discussed above, the library can be received along with the GUI executable, or separately. The library can be compiled by developers and include all pre-defined operators available to the designer.

If the library has been received, the terminal proceeds to 304. If the library has not been received, the terminal can wait at 302.

In 304, the terminal tests whether an effect definition has been received from a GUI. The terminal can provide a GUI to the designer, for example, by executing the GUI executable received in 300. The GUI can receive designer inputs specifying a new effect, such as which operators to use, in what order the operators are used, and parameters for each operator.

If the effect definition has been received, the terminal proceeds to 306. If the effect definition has not been received, the terminal awaits designer input via the GUI at 304.

In 306, the terminal optionally previews the effect definition as applied to a test image. For example, the designer can specify an image on which to test the effect definition as inputted in 304.

It will be appreciated that the designer can return to 304 to revise the effect definition after previewing.

In 308, the terminal saves the effect definition received in 304 and previewed in 306 to memory. For example, the effect definition can be saved to volatile or non-volatile memory accessible to the terminal, locally or over a network.

In 310, the terminal uploads the effect definition received in 304 and previewed in 306 to a server. The server can be as illustrated in FIG. 7 and process the effect definition into a module accessible to users over a network.

In 312, the terminal exits the procedure.

Figure 4A:
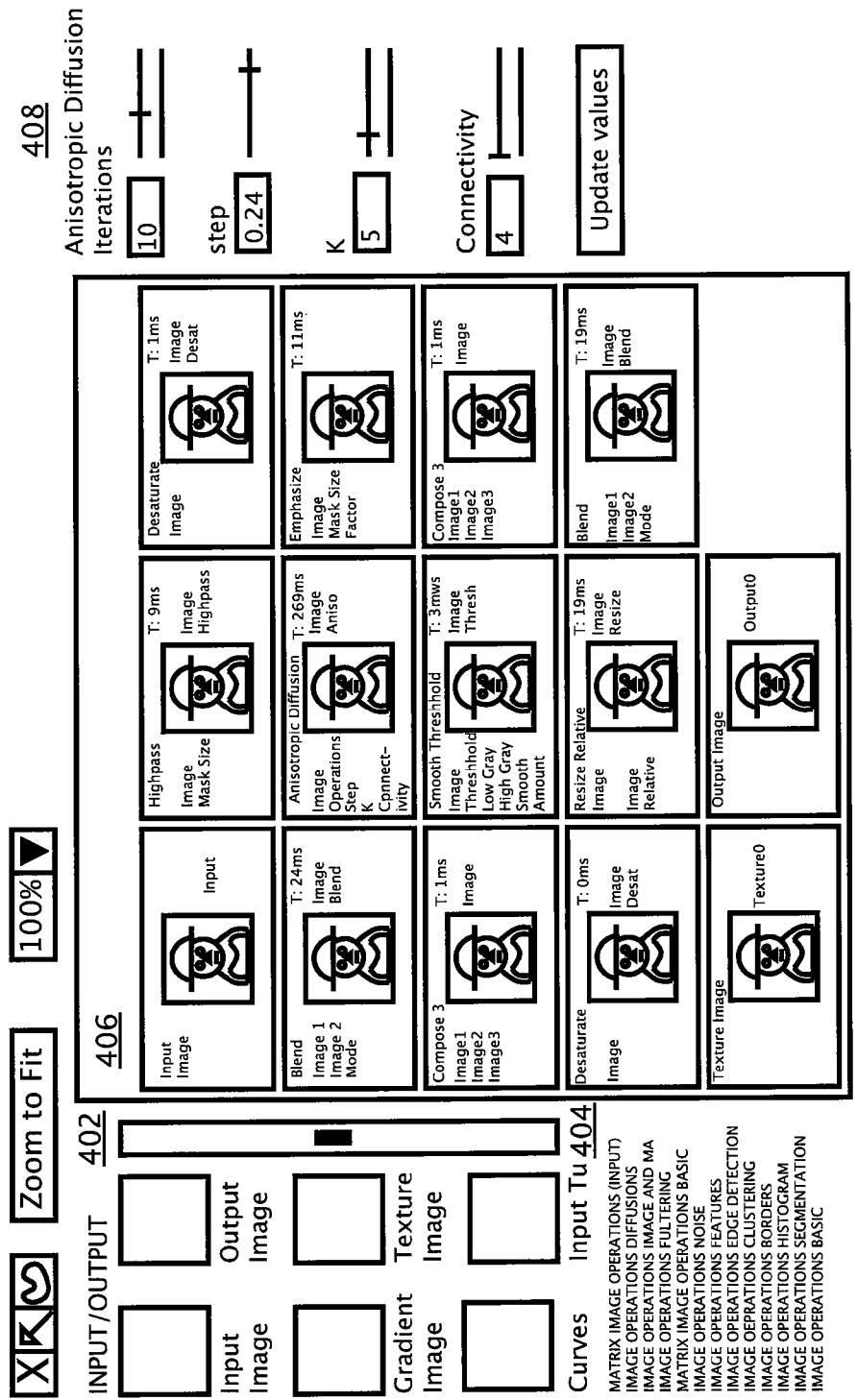
FIG. 4A illustrates a first example screen shot of a GUI allowing a designer to design an effect.

FIG. 4A illustrates a first example screen shot of a GUI allowing a designer to design an effect. The GUI can be displayed on a terminal to a designer as illustrated in FIG. 6. The terminal can upload an effect definition created by the designer to a server as illustrated in FIG. 7.

The GUI includes tools 400 for the user to define the effect. The tools can include a delete, select, move, a zoom, and other tools.

The GUI includes an input/output portion 402. The input/output portion 402 can allow a designer to specify an input image to use and an output image to write a processed image to.

The GUI includes a list of available operators 404. For example, available operators can be stored in a compiled library received by the terminal, as discussed above.

The GUI includes a graphical view of the current effect definition. The GUI can be a node-based interface, in which each operator is depicted as a node. Operators can be linked to each other to indicate order of execution. Each node can also include a preview thumbnail of an image illustrating the result of the operator.

The GUI includes operator parameters 408. The designer can select specific nodes or operators, and a set of available parameters will appear. The designer can manipulate various parameters via standard GUI input fields, such as slider bars, buttons, text fields, etc.

Figure 4B:
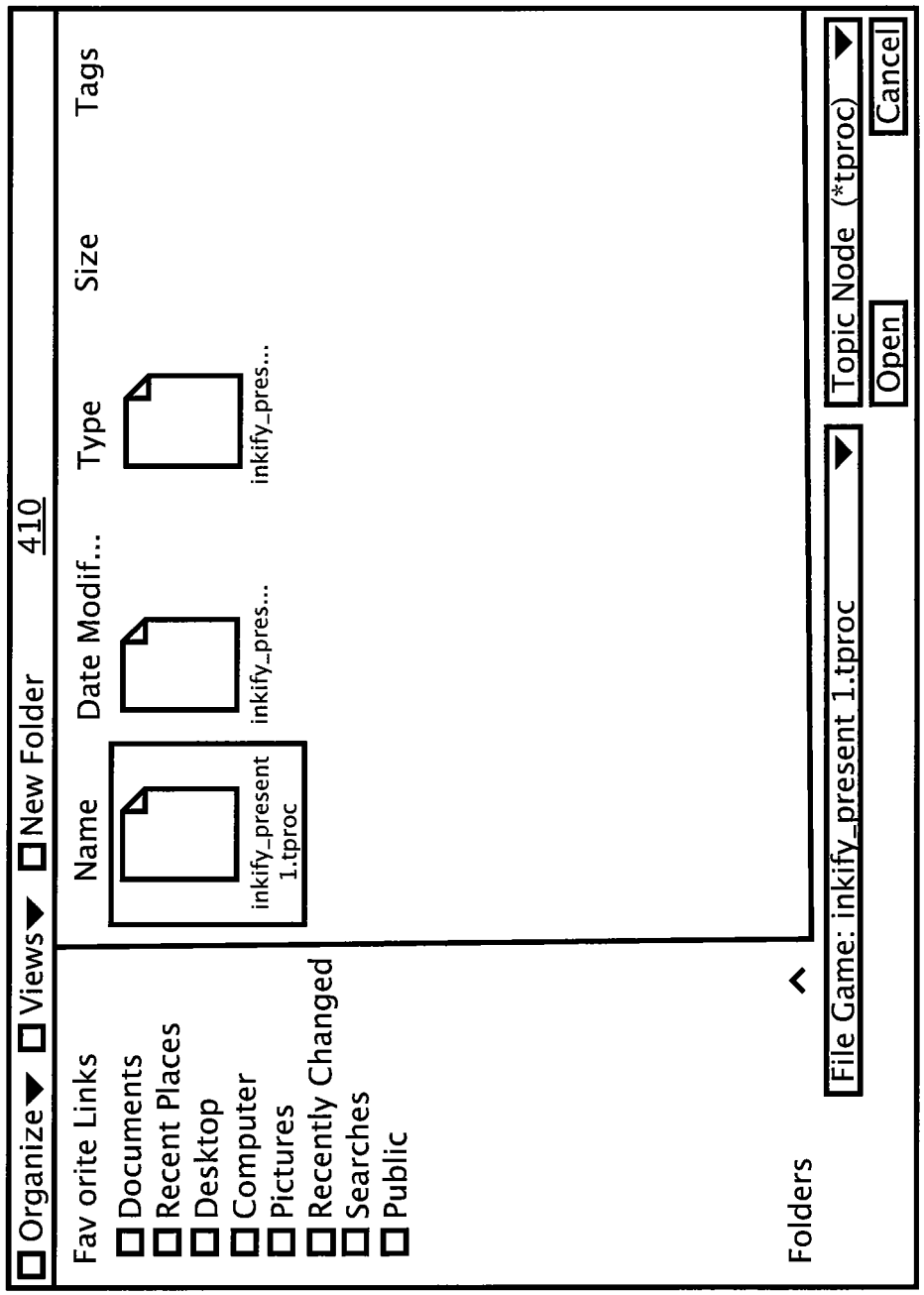
FIG. 4B illustrates a second example screen shot of a GUI allowing a designer to design an effect.

FIG. 4B illustrates a second example screen shot of a GUI allowing a designer to design an effect. The screen shot illustrates an explorer window that allows a user to view available effects 410 already defined and stored on a terminal. For example, the available effects can be previously defined by the designer and saved on a local hard drive.

Figure 4C:
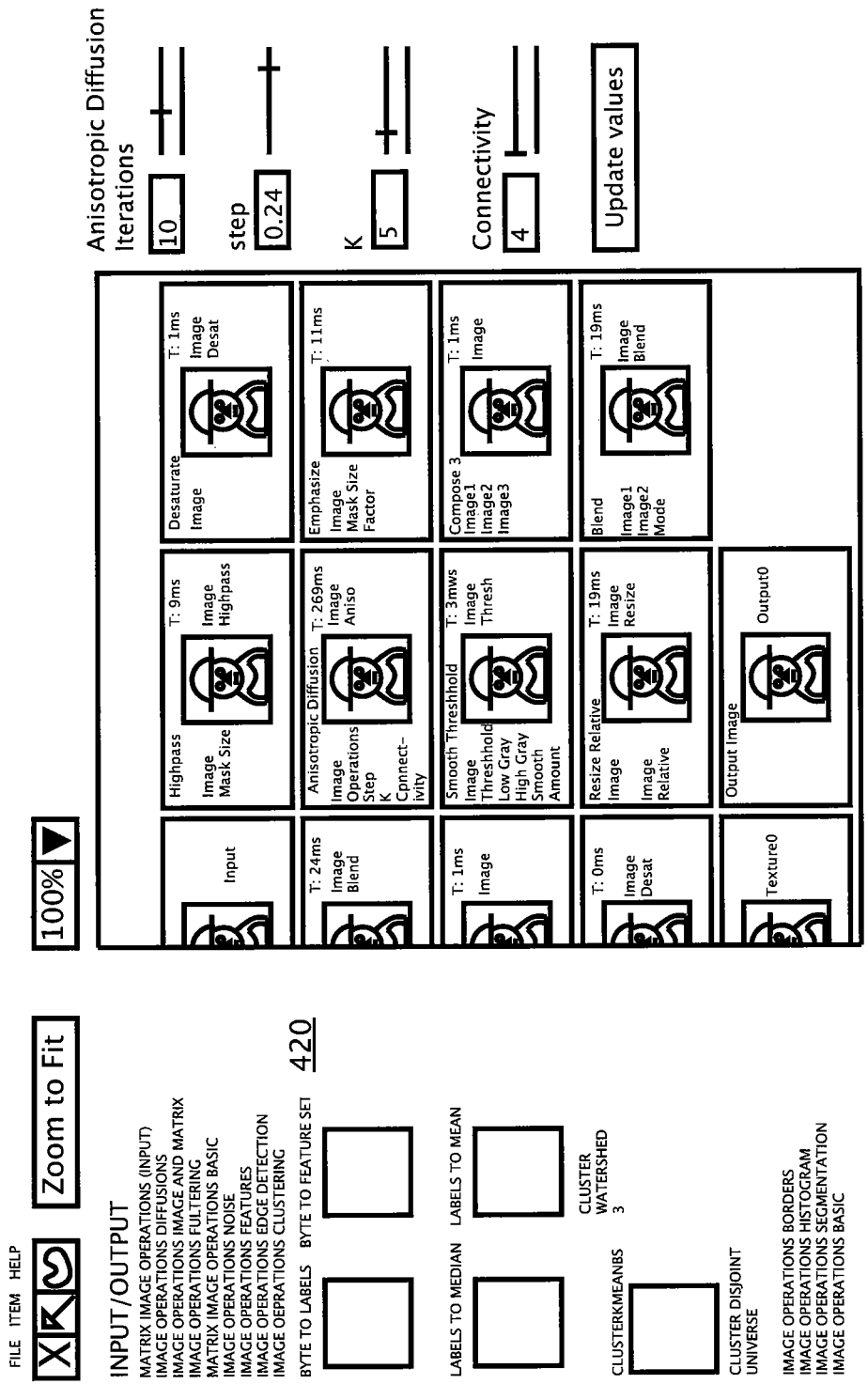
FIG. 4C illustrates a third example screen shot of a GUI allowing a designer to design an effect.

FIG. 4C illustrates a third example screen shot of a GUI allowing a designer to design an effect. The screen shot can be similar to that illustrated in FIG. 4A. An operator has been selected from the list of available operators. A menu 420 can appear showing additional parameters related to the selected operator to be set by the designer.

Figure 4D:
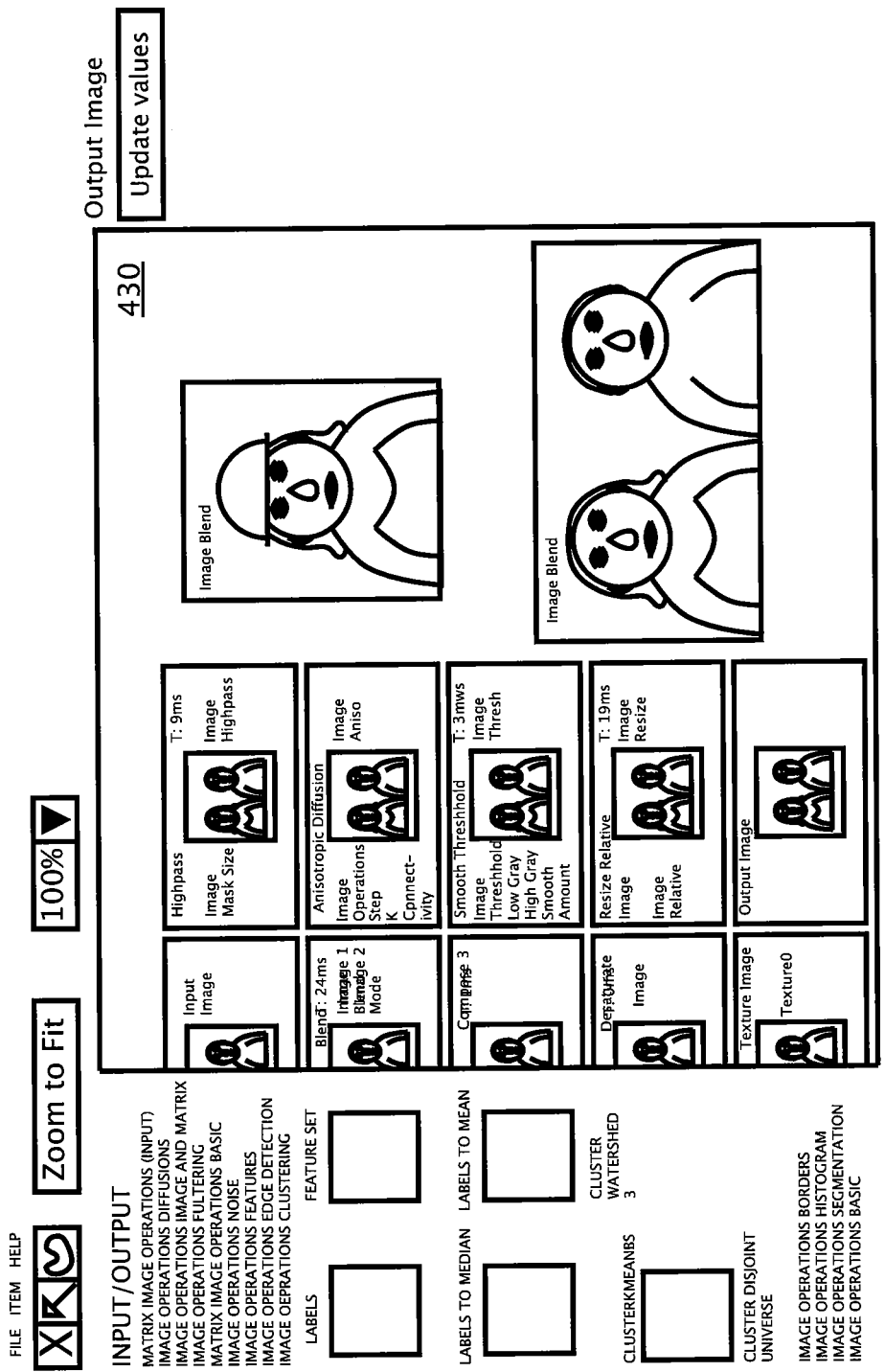
FIG. 4D illustrates a fourth example screen shot of a GUI allowing a designer to design an effect.

FIG. 4D illustrates a fourth example screen shot of a GUI allowing a designer to design an effect. The screen shot can be similar to that illustrated in FIG. 4A. A preview option has been activated to display a processed image processed by the effect as defined. This allows the designer to preview results of an effect during the design process.

Figure 4E:
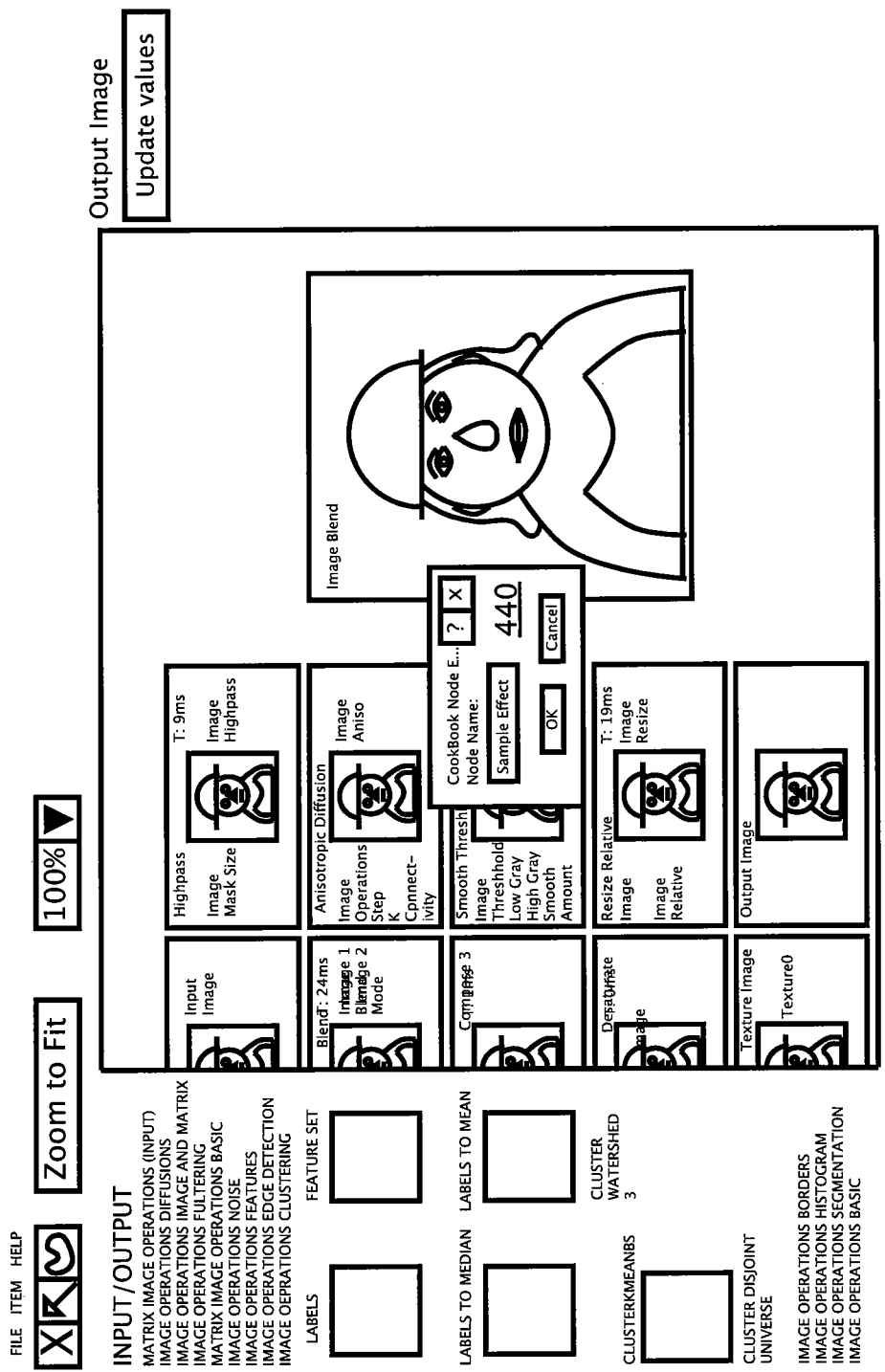
FIG. 4E illustrates a fifth example screen shot of a GUI allowing a designer to design an effect.

FIG. 4E illustrates a fifth example screen shot of a GUI allowing a designer to design an effect. The screen shot can be similar to that illustrated in FIG. 4A. The GUI can allow the designer to rename a node in a window 440. It will be appreciated that the GUI can also allow the designer to rename the effect definition.

Figure 4F:
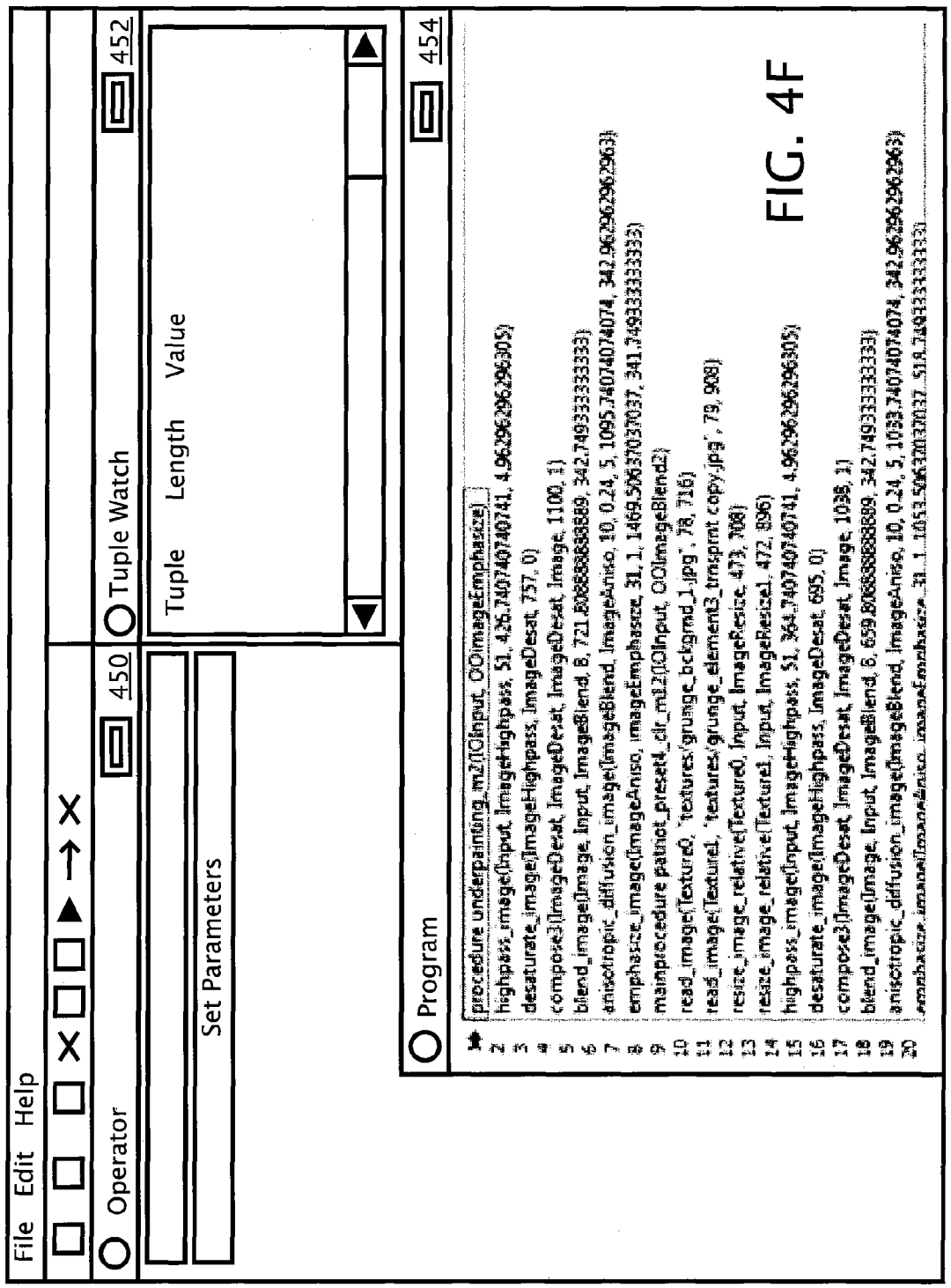
FIG. 4F illustrates a sixth example screen shot of a GUI allowing a designer to design an effect.

FIG. 4F illustrates a sixth example screen shot of a GUI allowing a designer to design an effect. The screen shot can be used to debug an effect definition. The screen shot illustrates an operator parameter input area 450. If the designer does not wish to utilize the GUI, parameters can be manually inputted as text. During execution or preview of the effect, the designer can examine parameter value in area 452. For example, specific parameters can be added to a watch list. The effect definition can also include a script version of the effect in program window 454. This allows the designer to view and modify a script language version of the effect.

It will be appreciated that screen shot can illustrate a more advanced interface for designers desiring more control over the definition process. By removing the GUI, more parameters are accessible to the designer for manipulation.

Figure 5A:
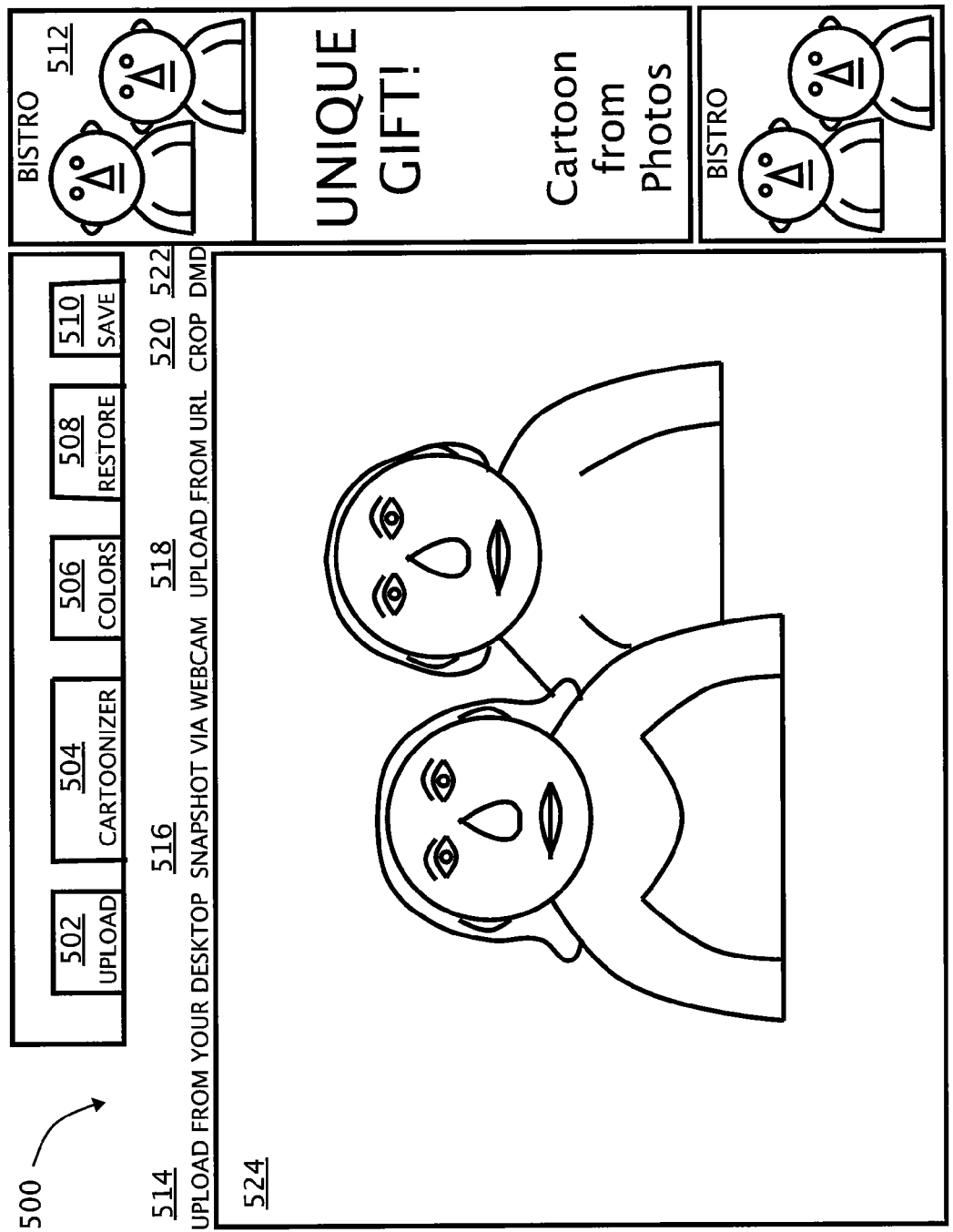
FIG. 5A illustrates a first example screen shot for generating a cartoon.

FIG. 5A illustrates a first example screen shot 500 for generating a cartoon. For example, cartoon effects can be a subset of effects available from a server. The user interface depicted below can be provided to a user over a network such as the Internet and allow the user to cartoonize a provided image.

The screen shot 500 can include an upload tab 502. The upload tab 502 can provide functionality related to uploading an image or digital photo for processing.

The screen shot 500 can include a cartoonizer tab 504. The cartoonizer tab 504 can provide functionality related to converting the image into a cartoon, as discussed elsewhere.

The screen shot 500 can include an extra tab 506. The extra tab 506 can include extra functionality not belonging in either the upload tab 502 or the cartoonizer tab 504.

The screen shot 500 can include a restore button 508. The restore button 508 can roll back all user changes to an image. For example, user changes can be made via functionality provided with the cartoonizer tab 504. In an alternative embodiment, the restore button 508 can undo a last user change to the image.

The screen shot 500 can include a save button 510. The save button 510 can save all user changes to an image. In one embodiment, the image can be saved on the server and a Uniform Resource Locator (URL) address pointing to the image provided to the user. In another embodiment, the image can be saved to a user-specified location.

The screen shot 500 can include an advertisement 512. For example, the advertisement 512 can relate to products and services relevant to the image processing. Example products and services include hardcopy photographs and merchandise printed or otherwise illustrated with the processed image.

The buttons below can provide functionality associated with uploading an image for processing.

The screen shot 500 can include an upload button 514. The upload button 514 can allow a user to select a local image from the user's terminal for upload to the server.

The screen shot 500 can include a snapshot via webcam button 518. The snapshot button 518 can allow a user to provide an image taken with a locally available webcam or other photo-taking device, such as a digital camera.

The screen shot 500 can include an upload from URL button 520. The URL button 520 can allow a user to provide an URL address pointing to an image. The server the retrieves the image for processing.

The screen shot 500 can include a crop button 520. The crop button 520 can trigger an interface allow the user to crop an uploaded photograph. For example, unnecessary background can be removed. The photograph can be cropped to reduce size and processing time.

The screen shot 500 can include a help button 522. The help button 522 can provide a help interface describing functionality associated with each tab and button in the screen shot 500.

The screen shot 500 can include the uploaded image 524. After the user has uploaded an image, the uploaded image 524 can be displayed for user review. The user can, for example, crop the image and save the image, as discussed above.

Figure 5B:
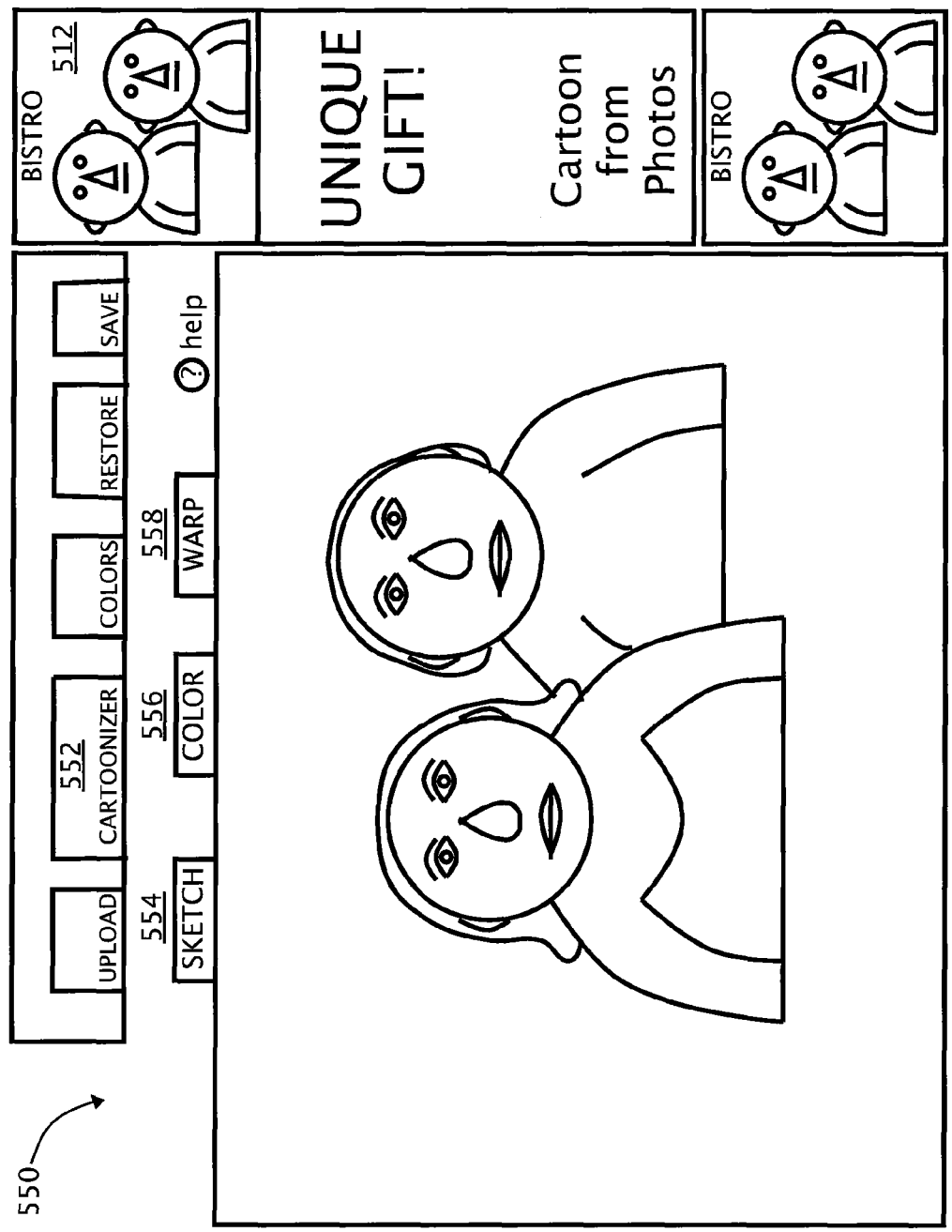
FIG. 5B illustrates a second example screen shot for generating a cartoon.

FIG. 5B illustrates a second example screen shot 550 for generating a cartoon. The screen shot 550 can be similar to the screen shot of FIG. 5A, but depicting functionality associated with the cartoonizer.

The screen shot 550 can include a selected cartoonizer tab 552. As discussed above, the cartoonizer tab 552 can provide the user with functionality associated with processing the image.

The buttons below can provide functionality associated with processing an uploaded image.

The screen shot 550 can include a sketch button 554. The sketch button 554 can provide functionality associated with a sketch function, as illustrated later. Sketch functionality can include receiving user-specified parameters and processing the image in accordance with predefined algorithms utilizing the received parameters, as discussed.

The screen shot 550 can include a color button 556. The color button 556 can provide functionality associated with a colorization function, as illustrated later. Colorization functionality can include receiving user-specified parameters and processing the image in accordance with predefined algorithms utilizing the received parameters, as discussed.

The screen shot 550 can include a warp button 558. The warp button 558 can provide functionality associated with a warping function, as illustrated later. Warping functionality can include receiving user-specified parameters and processing the image in accordance with predefined algorithms utilizing the received parameters, as discussed.

It will be appreciated that other functionality can be associated with processing the image, as discussed elsewhere. Additional tabs can be provided in the user interface, and each tab can be associated with additional buttons to support an additional functionality.

Figure 5C:
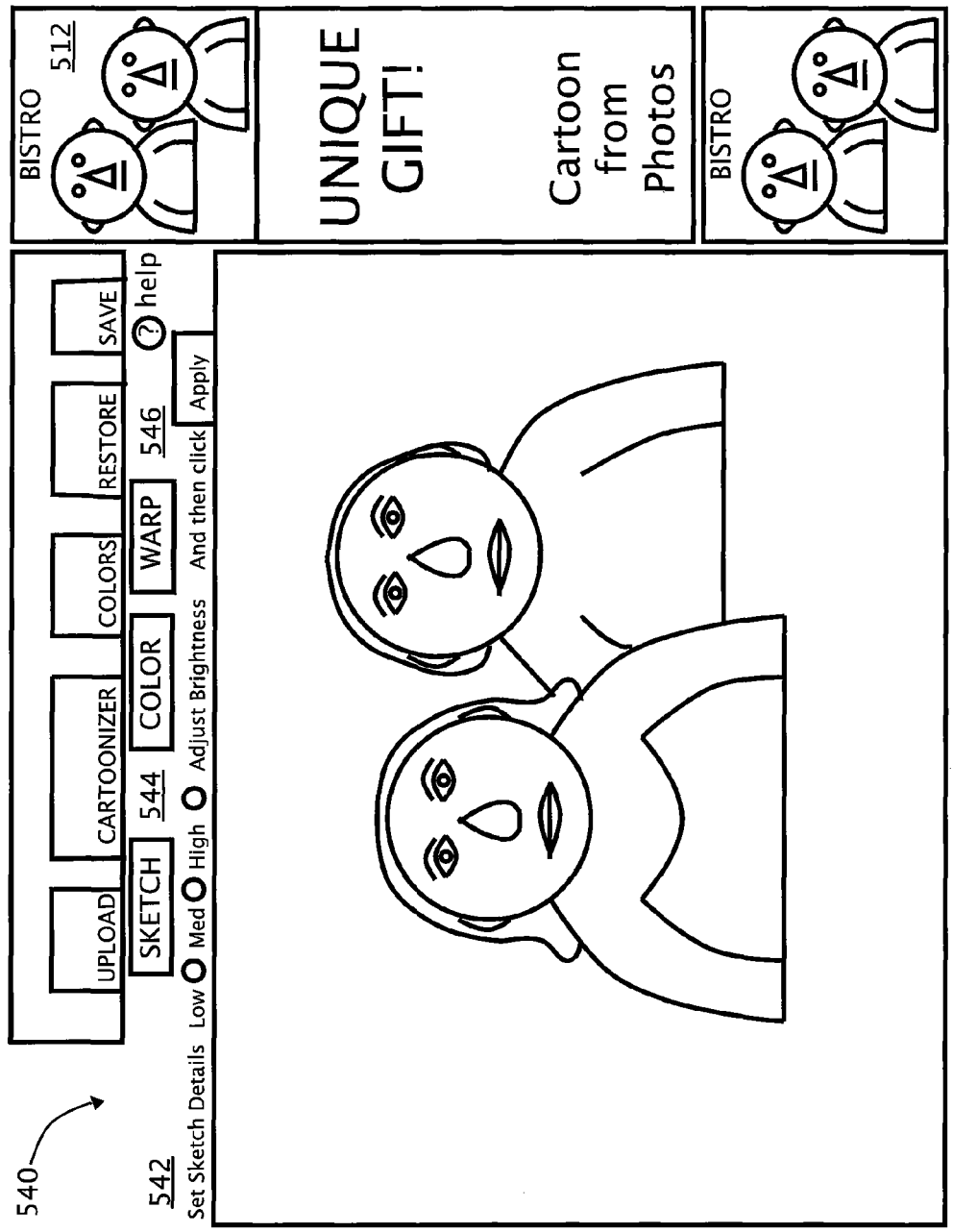
FIG. 5C illustrates a third example screen shot for generating a cartoon.

FIG. 5C illustrates a third example screen shot 540 for generating a cartoon. The screen shot 540 can be similar to the screen shot of FIG. 5B, but depicting functionality associated with the sketch button.

Once the sketch button has been selected, the user interface provides the screen shot 540 to receive user-specified parameters for the sketch function.

The screen shot 540 can include sketch detail radio buttons 542. The user can specify a level of detail to be produced in the sketch, such as "low", "medium", or "high". It will be appreciated that alternative input fields can be used, such as a text field, a slider, or other input field.

The screen shot 540 can include a brightness slider 544. The user can specify a level of brightness to be produced in the sketch. As above, alternative input fields can be used.

The screen shot 540 can include an apply button 546. Once the user has specified the required parameters and any optional parameters, the user clicks the apply button 546. The server then processes the image in accordance with the user-specified parameters.

It will be appreciated that other parameters can be associated with processing the image into a sketch, as discussed. Additional input fields can receive parameters from the user to provide greater user control over the sketch function.

Figure 5D:
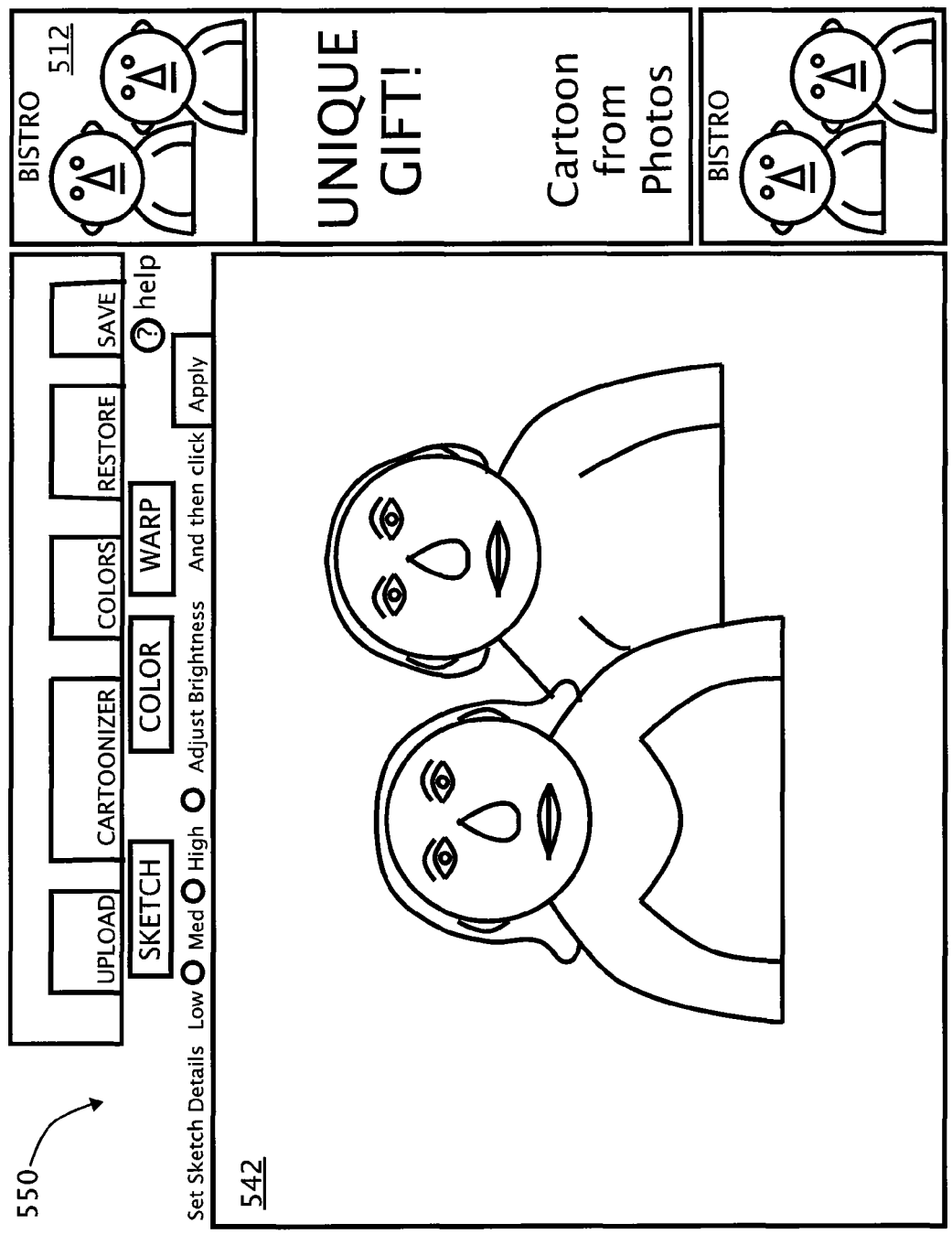
FIG. 5D illustrates a fourth example screen shot for generating a cartoon.

FIG. 5D illustrates a fourth example screen shot 550 for generating a cartoon. The screen shot 550 can be similar to the screen shot of FIG. 5C, but depicting a processed image 542. The image can be processed into a sketch in accordance with user-specified parameters, discussed above.

Figure 5E:
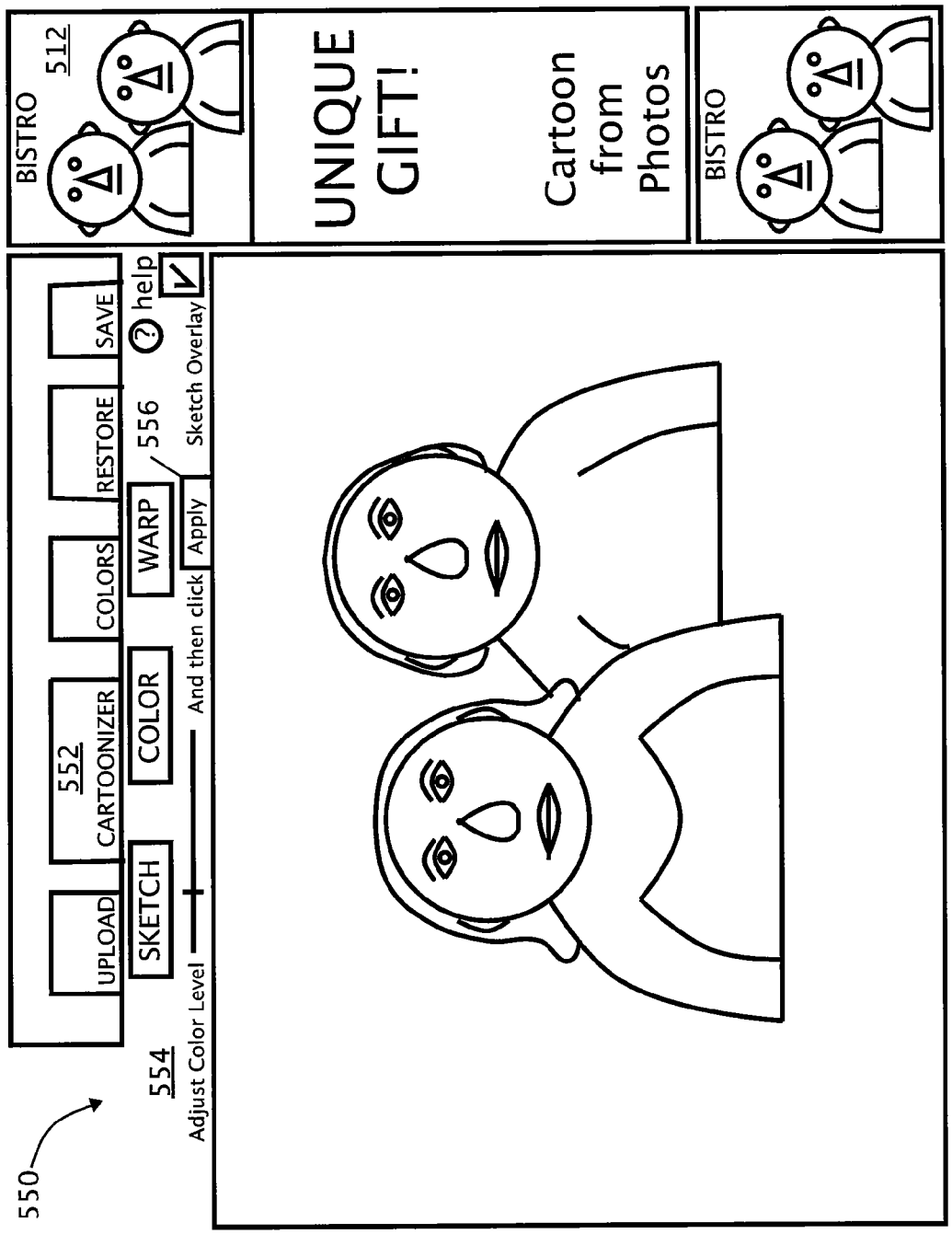
FIG. 5E illustrates a fifth example screen shot for generating a cartoon.

FIG. 5E illustrates a fifth example screen shot 550 for generating a cartoon. The screen shot 550 can be similar to FIG. 5B, except the color button 552 has been selected instead of the sketch button. The screen shot 550 includes parameters for colorization functionality.

The screen shot 550 can include a color level slider bar 554. The color level slider 554 allows the user to specify a color level, as discussed.

The screen shot 550 can include an apply button 556. Once the user has specified the required parameters and any optional parameters, the user clicks the apply button 556. The server then processes the image in accordance with the user-specified parameters.

Figure 5F:
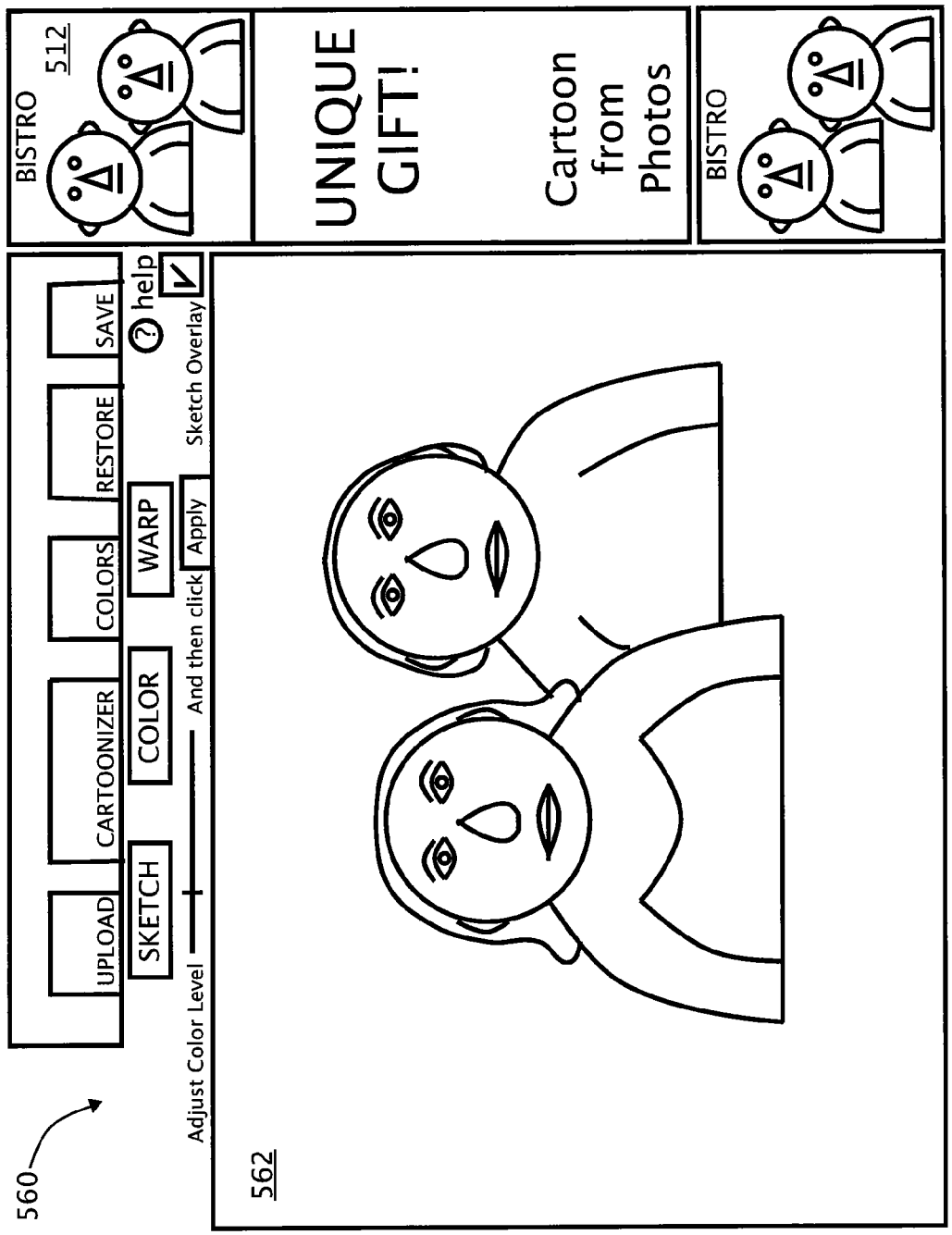
FIG. 5F illustrates a sixth example screen shot for generating a cartoon.

FIG. 5F illustrates a sixth example screen shot 560 for generating a cartoon. The screen shot 560 can be similar to the screen shot of FIG. 5E, but depicting a processed image 562. The image can be processed by a colorization function in accordance with user-specified parameters, discussed above.

FIG. 6 illustrates an example terminal for providing user-accessible effects. The terminal 600 can be a cellular phone, a PDA, or a similar portable device used by a user 602. The terminal 600 is configured to interface between a user 602 and a server, allowing the user to apply selected effects to digital images. In one embodiment, the terminal can be used by a designer to define and upload an effect from available operators, as discussed above.

The terminal 600 can include a processor 604. The processor 604 can be a general purpose processor configured to execute computer-readable instructions operating the terminal 600 and associated peripherals. It will be appreciated that any number of processors can be included in the terminal 600, including specialized processors such as graphics processing units (GPU). The processor 604 can also be configured to execute the effects module 616, as discussed below.

The terminal 600 can include a clock 606. The clock 606 can provide a local time. The clock 606 can be periodically updated from a server in communications with the terminal 600.

The terminal 600 can include sensors 608. Sensors 608 can include audio input devices or optical input devices. Audio input devices can include microphones. Optical input devices can include cameras or light sensors. The sensors 608 can be configured to detect appropriate input and convert the input into input signals transmitted to the processor 604.

The terminal 600 can include a network interface 610. For example, the network interface 610 can communicate with a cellular wireless network, a wired network such as Ethernet, or a short range wireless network such as Bluetooth or Wi-Fi. The terminal 600 can include multiple network interfaces or a network interface configured to interface with multiple networks.

An Ethernet network allows the terminal 600 to communicate when plugged in. The terminal 600 can be assigned an IP address on the wired network. A short-range wireless network can be a Wi-Fi, Wi-Bree or Bluetooth network.

The terminal 600 can include an input/output interface 612. The interface 612 can receive user inputs from an input device and convert the user inputs into user commands. For example, input devices can include a touch screen display, a keypad, a microphone, an optical device, a pointer device, a scroll wheel, or other input devices.

The interface 612 can also transmit output to an output device in a form accessible to the user 602. For example, output devices can include a touch screen, a display screen, a speaker, an audio-out jack, an electromechanical motor for providing tactile output, or other output devices.

The terminal 600 can include a memory 614. The memory 614 can be read-only or read-write, persistent or volatile memory accessible to the processor 604. The memory 614 can store data required by the terminal 600 for operation and applications for execution.

The terminal 600 can store an effects module 616 in the memory 614 for execution. Upon execution, the effects module 616 can interact with a server to provide effects to user-selected images. For example, the effects module 616 can pre-process an image by cropping or performing color correction. For example, the effects module 616 can interact with the server to provide a user interface to the user 602.

FIG. 7 illustrates an example server for providing user-accessible effects. The server can apply user-selected effects to a user-selected digital image.

The server 700 includes a display 702. The display 702 can be equipment that displays viewable images, graphics, text, and other output generated by the server 700 to a server administrator. For example, the display 702 can be a cathode ray tube or a flat panel display such as a TFT LCD. The display 702 includes a display surface, circuitry to generate a viewable picture from electronic signals sent by the server 700, and an enclosure or case. The display 702 can interface with an input/output interface 708, which converts data from a central processor unit 712 to a format compatible with the display 702.

The server 700 includes one or more additional output devices 704. The output device 704 can be any hardware used to communicate outputs to the administrator. For example, the output device 704 can include audio speakers and printers or other devices for providing output.

The server 700 includes one or more input devices 706. The input device 706 can be any hardware used to receive inputs from the administrator. The input device 706 can include keyboards, mouse pointer devices, microphones, scanners, video and digital cameras, etc.

The server 700 includes an input/output interface 708. The input/output interface 708 can include logic and physical ports used to connect and control peripheral devices, such as output devices 704 and input devices 706. For example, the input/output interface 708 can allow input and output devices 704 and 706 to communicate with the server 700.

The server 700 includes a network interface 710. The network interface 710 includes logic and physical ports used to connect to one or more networks. For example, the network interface 710 can accept a physical network connection and interface between the network and the workstation by translating communications between the two. Example networks can include Ethernet, the Internet, or other physical network infrastructure. Alternatively, the network interface 710 can be configured to interface with a wireless network. Alternatively, the server 700 can include multiple network interfaces for interfacing with multiple networks.

As illustrated, the network interface 710 communicates over a network 718. Alternatively, the network interface 710 can communicate over a wired network. It will be appreciated that the server 700 can communicate over any combination of wired, wireless, or other networks.

The server 700 includes a central processing unit (CPU) 712. The CPU 712 can be an integrated circuit configured for mass-production and suited for a variety of computing applications. The CPU 712 can sit on a motherboard within the server 700 and control other workstation components. The CPU 712 can communicate with the other components via a bus, a physical interchange, or other communication channel.

The server 700 includes memory 714. The memory 714 can include volatile and non-volatile storage memory accessible to the CPU 712. The memory can be random access and provide fast access for graphics-related or other calculations. In an alternative embodiment, the CPU 712 can include on-board cache memory for faster performance.

The server 700 includes mass storage 716. The mass storage 716 can be volatile or non-volatile storage configured to store large amounts of data. The mass storage 716 can be accessible to the CPU 712 via a bus, a physical interchange, or other communication channel. For example, the mass storage 716 can be a hard drive, a RAID array, flash memory, CD-ROMs, DVDs, HD-DVD or Blu-Ray mediums.

The server 700 can execute an effect module 720 stored in memory 714. The cartoon generation module 720 can process images in accordance with predefined algorithms and user-specified parameters, as discussed above. The processed image can be provided to the user over the network 718.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

As discussed above, one embodiment of the present invention can be a method for a method for generating user-accessible effects. The method includes receiving a library of operators, each operator including a set of operations performable on an image. The method includes interacting with a designer via a node-based graphical user interface to receive an effect definition, wherein the effect definition defines a set of operators to be executed on an image and a set of parameters associated with each operator. The method includes, responsive to a change of the effect definition, previewing a result of the effect definition applied to a developer-specified image. The method includes saving the effect definition to an accessible memory. The method includes uploading the effect definition to a server for compilation into a script module for execution responsive to a user request. The method includes receiving a template effect definition, wherein the template effect definition is displayed in the node-based graphical user interface for editing. The method includes receiving a graphical user interface executable with the library of operators and the template effect definition. New operators can be coded by developers and compiled into the library of operators. The operators can include at least one of: transforming, clustering, diffusion, filtering, and thresholding. The server can receive a user-specified image to process with the script module. The server can execute the script module on the user-specified image and provides a processed image to a user.

Another embodiment of the present invention can be a workstation for generating user-accessible effects. The workstation includes a processor. The processor can be configured to receive a library of operators, each operator including a set of operations performable on an image. The processor can be configured to interact with a designer via a node-based graphical user interface to receive an effect definition, wherein the effect definition defines a set of operators to be executed on an image and a set of parameters associated with each operator. The processor can be configured to, responsive to a change of the effect definition, preview a result of the effect definition applied to a developer-specified image. The processor can be configured to save the effect definition to an accessible memory. The processor can be configured to upload the effect definition to a server for compilation into a script module for execution responsive to a user request. The processor can be configured to receive a template effect definition, wherein the template effect definition is displayed in the node-based graphical user interface for editing. The processor can be configured to receive a graphical user interface executable with the library of operators and the template effect definition. New operators can be coded by developers and compiled into the library of operators. The operators can include at least one of: transforming, clustering, diffusion, filtering, and thresholding. The server can receive a user-specified image to process with the script module. The server can execute the script module on the user-specified image and provides a processed image to a user.

Another embodiment of the present invention can be a computer-readable storage medium including instructions adapted to execute a method for generating user-accessible effects. The method includes receiving a library of operators, each operator including a set of operations performable on an image. The method includes interacting with a designer via a node-based graphical user interface to receive an effect definition, wherein the effect definition defines a set of operators to be executed on an image and a set of parameters associated with each operator. The method includes, responsive to a change of the effect definition, previewing a result of the effect definition applied to a developer-specified image. The method includes saving the effect definition to an accessible memory. The method includes uploading the effect definition to a server for compilation into a script module for execution responsive to a user request. The method includes receiving a template effect definition, wherein the template effect definition is displayed in the node-based graphical user interface for editing. The method includes receiving a graphical user interface executable with the library of operators and the template effect definition. New operators can be coded by developers and compiled into the library of operators. The operators can include at least one of: transforming, clustering, diffusion, filtering, and thresholding. The server can receive a user-specified image to process with the script module. The server can execute the script module on the user-specified image and provides a processed image to a user.

The specific embodiments described in this document represent examples or embodiments of the present invention, and are illustrative in nature rather than restrictive. In the above description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" or "some embodiments" means that a particular feature, structure, or characteristic described in connection with the embodiment is included in at least one embodiment of the present invention. Features and aspects of various embodiments may be integrated into other embodiments, and embodiments illustrated in this document may be implemented without all of the features or aspects illustrated or described. It will be appreciated to those skilled in the art that the preceding examples and embodiments are exemplary and not limiting.

While the system, apparatus and method have been described in terms of what are presently considered to be the most practical and effective embodiments, it is to be understood that the disclosure need not be limited to the disclosed embodiments. It is intended that all permutations, enhancements, equivalents, combinations, and improvements thereto that are apparent to those skilled in the art upon a reading of the specification and a study of the drawings are included within the true spirit and scope of the present invention. The scope of the disclosure should thus be accorded the broadest interpretation so as to encompass all such modifications and similar structures. It is therefore intended that the application includes all such modifications, permutations and equivalents that fall within the true spirit and scope of the present invention.

What is claimed is:

1. A method for generating user-accessible effects, comprising:
    receiving a library of operators, each operator including a set of operations performable on an image;
    interacting with a designer via a node-based graphical user interface to receive an effect definition defining a set of nodes, wherein each node of the set of nodes represents an operator to be executed on an image and a set of parameters associated with the operator;
    responsive to a change of the effect definition, previewing a plurality of intermediate results of each node of the set of nodes and a final result of the effect definition applied to a developer-specified image;
    saving the effect definition to an accessible memory; and
    uploading the effect definition to a server for compilation into a script module for execution responsive to a user request.

2. The method of claim 1, further comprising:
    receiving a template effect definition, wherein the template effect definition is displayed in the node-based graphical user interface for editing; and
    receiving a graphical user interface executable with the library of operators and the template effect definition.

3. The method of claim 2, wherein the graphical user interface executable is configured to illustrate one or more tabs, the one or more tabs each associated with specific functionality and selectable by the designer via the node-based graphical user interface.

4. The method of claim 1, wherein new operators are coded by developers and compiled into the library of operators.

5. The method of claim 1, wherein the operators include at least one of:
    transforming, clustering, diffusion, filtering, and thresholding.

6. The method of claim 1, wherein the server receives a user-specified image to process with the script module.

7. The method of claim 6, wherein the server executes the script module on the user-specified image and provides a processed image to a user.

8. A workstation for generating user-accessible effects, comprising:
a processor, the processor configured to,
receive a library of operators, each operator including a set of operations performable on an image,
interact with a designer via a node-based graphical user interface to receive an effect definition defining a set of nodes, wherein each node of the set of nodes represents an operator to be executed on an image and a set of parameters associated with the operator,
responsive to a change of the effect definition, preview a plurality of intermediate results of each node of the set of nodes and a final result of the effect definition applied to a developer-specified image,
save the effect definition to an accessible memory, and
upload the effect definition to a server for compilation into a script module for execution responsive to a user request.

9. The workstation of claim 8, the processor further configured to:
receive a template effect definition, wherein the template effect definition is displayed in the node-based graphical user interface for editing.

10. The workstation of claim 9, the processor further configured to:
receive a graphical user interface executable with the library of operators and the template effect definition.

11. The workstation of claim 8, wherein new operators are coded by developers and compiled into the library of operators.

12. The workstation of claim 8, wherein the operators include at least one of: transforming, clustering, diffusion, filtering, and thresholding.

13. The workstation of claim 8, wherein the server receives a user-specified image to process with the script module.

14. The workstation of claim 13, wherein the server executes the script module on the user-specified image and provides a processed image to a user.

15. A non-transitory computer-readable storage medium including instructions adapted to execute a method for generating user-accessible effects, the method comprising:
receiving a library of operators, each operator including a set of operations performable on an image;
interacting with a designer via a node-based graphical user interface to receive an effect definition defining a set of nodes, wherein each node of the set of nodes represents an operator to be executed on an image and a set of parameters associated with the operator;
responsive to a change of the effect definition, previewing a plurality of intermediate results of each node of the set of nodes and a final result of the effect definition applied to a developer-specified image;
saving the effect definition to an accessible memory; and
uploading the effect definition to a server for compilation into a script module for execution responsive to a user request.

16. The non-transitory computer-readable storage medium of claim 15, wherein the method further comprises:
receiving a template effect definition, wherein the template effect definition is displayed in the node-based graphical user interface for editing.

17. The non-transitory computer-readable storage medium of claim 16, wherein the method further comprises:
receiving a graphical user interface executable with the library of operators and the template effect definition.

18. The non-transitory computer-readable storage medium of claim 15, wherein the method further comprises compiling new operators coded by developers into the library of operators.

19. The non-transitory computer-readable storage medium of claim 15, wherein the operators include at least one of: transforming, clustering, diffusion, filtering, and thresholding.

20. The non-transitory computer-readable storage medium of claim 15, wherein the method further comprises receiving, at the server, a user-specified image to process with the script module and the server executes the script module on the user-specified image and provides a processed image to a user.

* * * * *